3,443,804
CUTTING TORCH CARRIAGE WITH
SLIDABLE DRAWER
Georg Röder, Frankfurt am Main-Fechenheim, Germany, assignor to Messer Griesheim G.m.b.H., Frankfurt am Main, Germany, a corporation of Germany
Filed Sept. 22, 1966, Ser. No. 581,266
Claims priority, application Germany, Sept. 24, 1965, M 66,758
Int. Cl. B23k 37/02
U.S. Cl. 266—23                                7 Claims

ABSTRACT OF THE DISCLOSURE

A cutting torch carriage for a metal cutting machine functions as the housing for a set of cutting controls which are disposed in a slidable drawer in the carriage. The controls are carried by a support pivotally mounted in the drawer for rotation so that the controls are accessible from many different directions when the drawer is opened.

---

The present invention relates to carriages for cutting torch machines, more particularly to control arrangements for such carriages.

Cutting torch machines generally have substantial carriages on which a plurality of oxyacetylene cutting torches or the like are mounted and by traversing movement of the carriages the torches are carried along a predetermined path to burn a corresponding path through a metal workpiece and thus cut the workpiece into the desired shape. The torches themselves may also be movable with respect to the carriage to provide a greater range of cutting paths.

Each cutting torch requires a set of controls not only for controlling its cutting path, but for adjusting the flow of oxygen and acetylene. These controls are preferably electrically operated and located in separate groups for the individual torches. Each such control group can occupy substantial space, yet the groups should be relatively close to their respective torches so that each torch can be conveniently observed while its controls are adjusted.

Among the objects of the present invention is the provision of a cutting torch carriage with drawers that hold the controls for the individual torches in such a way that the controls are easily accessible from many different directions yet they are protected against the heat, fumes and other adverse effects of the torches.

The foregoing and other objects of the invention will be more readily understood from the following description of several of its exemplifications, reference being made to the accompanying drawing wherein the figure is a somewhat schematic isometric illustration of a broken-away section of a cutting torch carriage typical of the present invention.

According to the present invention a cutting torch carriage for a metal-cutting machine has a set of cutting controls in a drawer slidable in and out of the carriage, the controls being carried by a support pivotally mounted in the drawer for rotation so that the controls are accessible from many different directions when the drawer is opened. The carriage can completely enclose the sides and rear of the drawer when the drawer is closed, and the drawer front can have a panel that seats against the carriage when the drawer is closed to protect the drawer contents from dust and the like.

The drawer is preferably arranged so that the pivotal support for the controls is with respect to an axis that extends in the direction of drawer movement. Also the drawer is desirably without side or bottom panels for greater accessibility of the controls. Locking means can also be provided to selectably secure the pivotally mounted support in a fixed position from which it cannot rotate until the locking means is unlocked.

The pivotal mounting for the control-carrying support may be of the lift-out type so that the support can be readily removed from its drawer. A still further desirable modification is to have the drawer carried by guides that extend out beyond the drawer-receiving compartment of the carriage, enabling the drawer to be pulled out on the guides far enough to be completely outside the carriage.

The invention will now be explained in more detail in conjunction with the attached drawings, wherein.

Figure 1:
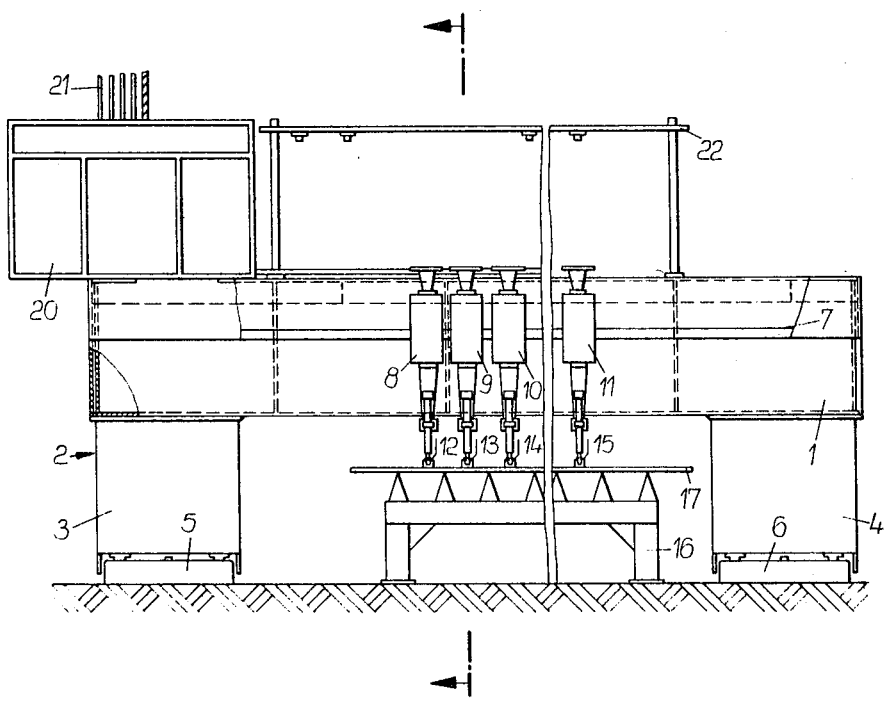
FIG. 1 is a front view, somewhat schematic, of an oxyacetylene cutting machine.

In FIG. 1 the number 1 refers to a beam constructed in the form of an elongated panel, and 2 refers to the entire carriage that includes the panel and is carried by two supports 3 and 4. The two supports 3 and 4 are movably mounted with respect to horizontally extending guide rail assemblies 5 and 6. Panel 1 also carries a rail 7 that extends perpendicularly to the guide rail assemblies 5 and 6 and movably holds four cutters 8, 9, 10 and 11. When in use the cutters are directed towards a workpiece such as 17 held on work bench 16. The movement of the cutters is controlled by orthogonal coordination between travel on the guide rail assemblies 5 and 6 on the one hand, and rail 7 on the other.

Figure 2:
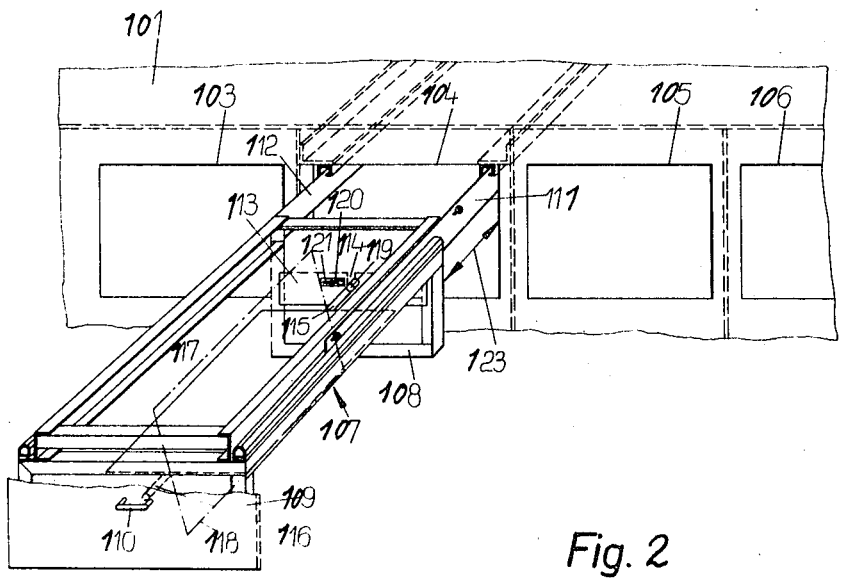
FIG. 2 shows a rear view of a cutting torch carriage.

Referring now to FIG. 2, the cutting torch carriage there represented at 101 is of generally rectangular box-shape and dust-tight construction provided with a number of drawer compartments 103, 104, 105 and 106. Each receives a control-containing drawer such as the one illustrated at 107 for compartment 104.

Drawer 107 is formed of a framework 108 of generally inverted U-shape with a longitudinally directed body carried on rails 111, 112 and end frames hanging down at the front and rear of the body. At the front of the drawer a panel 109 is affixed to the frame and is provided with a handle or pull 110. Panel 109 is a little larger than the mouth of compartment 104 so that when the drawer is closed the panel seats against the carriage surface around the entire compartment mouth and thus helps shield the drawer contents from dust and the like.

Rails 111, 112 are shown as telescopic so that when the drawer is pulled out these rails are extended out of the drawer compartment and the drawer is entirely outside the compartment. In the figure the distance 123 indicates a suitable space between the back of the drawer and the front of the compartment when the drawer is pulled out as far as it will go. Stops not shown can be provided on the rails or drawer frame to keep the drawer from being slid completely off the rails when pulled out.

The framework 108 includes at its front and rear frames journal mountings for a control support, shown as a plate 117. The rear mounting is illustrated at 114 as a notch in a cross member 113 that forms part of the frame. In the notch 114 is received a journal pin 115 that is secured to the control support 117. The front journal mounting may be correspondingly constructed to receive a similar journal pin 116. Both journal pins are aligned so that the support plate 117 can be pivoted around them, for example into the dash-line position 118. The various controls are mounted on the support plate, but are not illustrated in the figure.

The journal mountings are preferably located centrally of the drawer, that is half way down its height and half way across its width. This gives the greatest rotational freedom for the support plate. The plate is desirably arranged to be selectably locked in its full-line position so that the drawer can be opened or shut without having any parts of the plate, or of controls carried by it, inadvertently tilted into a position that obstructs drawer movement, as by interference with the mouth of the drawer compartment. Such locking is simply effected with a locking bolt 119 slidably held in a tubular guide 120 on cross member 113 and cooperating with a socket suitably located on journal pin 115 to receive the end of the bolt. Sliding the locking bolt away from the pin 115 into the position illustrated in the figure also permits the plate 117 to be lifted out of the drawer, the journal pins moving up out of their respective notches. The plate can also be remounted in the drawer by merely lowering it in place, after which locking of the locking bolt will secure the plate in place.

As illustrated, the drawer has no side or bottom panels. The controls on support plate 117 can accordingly be reached from many different directions. For certain machine attendants, i.e., those that are relatively tall, access from the top is most suitable. For shorter attendants access may be preferred from the side or even from the bottom. The particular height at which the drawer is installed in the carriage is also a factor. Also the controls on one drawer can be readily reached even though an adjacent drawer is also pulled out. The various controls can be mounted on both sides of support plate 117, if desired. Alternatively plate 117 may be replaced by a hollow box-type support and controls mounted within its hollow interior. This modification is particularly desirable since it provides an extra protection against dust and the like.

It is very helpful to have all the controls preassembled on a support plate or the like even before the plate is mounted in the drawer. In general, these controls will be the same for different cutting torches so that there is no real problem having such a prefabricated assembly. Prefabrication in this way is also helpful in any servicing that may be required. In the event of malfunction it is a simple matter to merely pull out an entire prefabricated control assembly and replace it by another.

The drawer rails need not be made telescopic so long as they can be positioned entirely within the compartment when their drawer is closed and will be pulled out as their drawer is pulled out to securely support the drawer when it is in fully extended position, as shown in the figure for example. A spacing, such as 123, between the drawer and the carriage, which spacing need only be about 2 or 3 inches, is of considerable help in reaching the controls as well as the locking bolt at the rear of the drawer and gripping the support plate when it is to be lifted out or lowered into the drawer.

Figure 3:
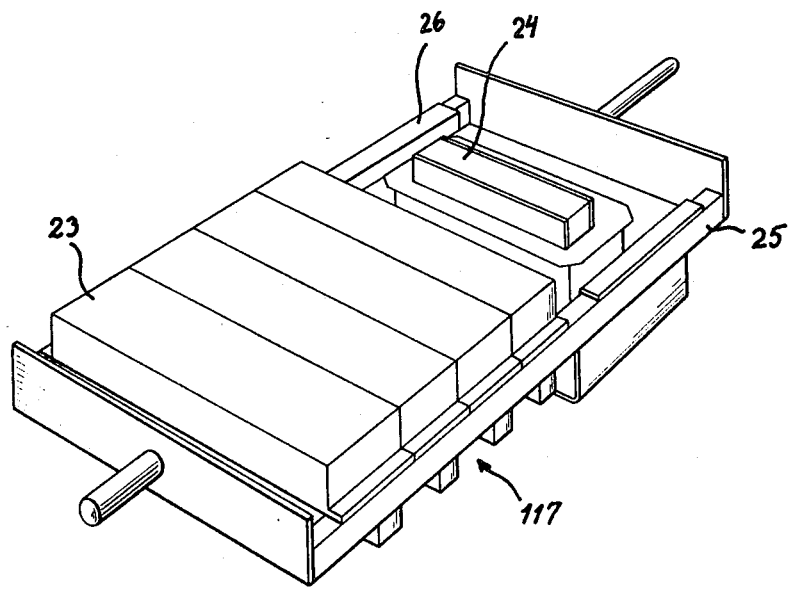
FIG. 3 shows a control support of the control-containing drawer according to FIG. 2.

Referring to FIG. 3 the controls fixed to the support plate 117 are represented at 23, 24. The controls 23, 24 are laterally suspended on parts 25, 26 of the support plate 117 and, as shown in FIG. 3, easily accessible from the upper and under side.

Obviously many modifications and variations of the present invention are possible in the light of the above teachings. It is, therefore, to be understood that the invention may be practised otherwise than as specifically described.

What is claimed:

1. A cutting torch carriage for a metal-cutting machine, a set of cutting controls in a drawer slidable in and out of the carriage, the controls being carried by a support pivotally mounted in the drawer for rotation so that the controls are accessible from many different directions when the drawer is opened.

2. The combination of claim 1 in which the carriage completely encloses the sides and rear of the drawer when the drawer is closed, and the drawer front has a panel that seats against the carriage when the drawer is closed to protect the drawer contents from dust and the like.

3. The combination of claim 1 in which the pivotal support is along an axis that extends in the direction of drawer movement.

4. The combination of claim 3 in which the drawer has no side or bottom panels.

5. The combination of claim 1 in which the drawer includes manipulatable locking means connected to selectably secure the pivotally mounted support in a fixed position.

6. The combination of claim 1 in which the pivotal mounting for the support is of the lift-out type that makes the support readily removably from the drawer.

7. The combination of claim 1 in which the carriage encloses the drawer when the drawer is closed, the drawer is carried by guides that extend out beyond the drawer-receiving compartment of the carriage, and the drawer can be pulled out on the guides so as to be completely outside the carriage.

References Cited

UNITED STATES PATENTS

| | | | |
|---|---|---|---|
| 2,336,596 | 12/1943 | Chouinard | 266—23 |
| 3,088,054 | 4/1963 | Meyer | 174—52 X |

JOHN J. CAMBY, *Primary Examiner.*